United States Patent [19]

Magorien et al.

[11] 4,197,097
[45] Apr. 8, 1980

[54] APPARATUS FOR VENTING GAS FROM A FLUID SYSTEM

[75] Inventors: Vincent G. Magorien, Granada Hills; Clarence L. Vogt, Burbank, both of Calif.

[73] Assignee: Seaton-Wilson Inc., Burbank, Calif.

[21] Appl. No.: 857,040

[22] Filed: Dec. 2, 1977

[51] Int. Cl.$^2$ .............................................. B01D 19/00
[52] U.S. Cl. ........................................ 55/165; 55/182; 55/189; 73/302; 116/276; 137/551
[58] Field of Search ................... 210/94, 120, 188, 86; 55/21, 55, 194, 160, 164, 189, 182, 165; 137/197, 198, 199, 551; 73/302; 116/114 PV, 117 R, 117 C

[56] References Cited

U.S. PATENT DOCUMENTS

| 3,321,909 | 5/1967 | Gordon | 137/199 |
|---|---|---|---|
| 3,583,435 | 6/1971 | Stewart | 137/551 |
| 3,681,562 | 8/1972 | Winzen | 210/94 |
| 3,948,147 | 4/1976 | Sauer et al. | 137/197 |
| 3,969,092 | 7/1976 | Huffman et al. | 55/160 |
| 4,077,427 | 3/1978 | Rosan, Jr. et al. | 137/551 |

Primary Examiner—Charles N. Hart
Assistant Examiner—R. W. Burks

[57] ABSTRACT

A gas venting mechanism includes a valve chamber that is at least partially filled with a liquid. At the top of the chamber, an outlet valve allows the gas to escape but retains the liquid. Air is admitted to the chamber through an inlet valve that prevents backflow of the liquid into a passage by which the gas is supplied. The chamber is transparent so that the venting of gas can be verified by observation. A piston that reduces the effective volume of the chamber facilitates testing of the chamber for leakage of the liquid. The venting mechanism can be advantageously combined with a degasser in an aircraft hydraulic system.

30 Claims, 4 Drawing Figures

APPARATUS FOR VENTING GAS FROM A FLUID SYSTEM

BACKGROUND OF THE INVENTION

The present invention relates to mechanisms for venting gases from fluid systems, and, more particularly, to mechanisms for venting air from the hydraulic systems of aircraft and the like.

It is well known that air tends to become entrained or dissolved in liquids such as the oil of hydraulic systems. Admitted through imperfect seals, for the most part, the air can form pockets at quiet spots in the system leading to possible pump cavitation and adversely affecting the heat conductivity, bulk modulus, oxidation resistance and other physical properties of the oil. It is, therefore, desirable to degas the oil, preferably on a continuous or cyclic basis, whenever the system is in use.

Degassing is a particularly difficult problem in an aircraft hydraulic system where size and weight limitations are severe, reliability is critical and the apparatus will sometimes be inverted and subjected to abrupt changes in altitude. A particularly advantagous degassing device suitable for use in aircraft is described in U.S. Pat. No. 3,969,092, entitled LIQUID DEGASSING DEVICE, issued to John A. Huffman and Vincent G. Magorien on July 13, 1976. While this degasser has proven highly effective, there is a desire for functional improvement in several respects.

It has been found to be difficult for maintenance personnel to determine whether a degasser is operating properly since the amount of air expelled is too small to be heard or felt. If verification of venting activity is desired, it is necessary to temporarily connect the degasser to a bubbler in which the passage of vented air through a fluid can be observed. This is an inconvenient and time consuming procedure since an aircraft degasser is often inaccessible.

In addition to the concern of aircraft designers that a degasser may cease to function effectively without the problem being detected, there is also a related concern that the degasser may fail in such a manner that oil will be allowed to escape with a resulting loss of pressure throughout the hydraulic system. Although the above-mentioned degasser contains a provision for preventing the escape of oil, there is no convenient testing procedure for determining whether the device is capable of operating properly in this emergency situation.

Accordingly, there is a need for an air venting mechanism that provides verification of the fact that air is being vented and prevents liquid from passing out of the system through the degasser. It is desirable that such a mechanism includes a provision for easily and conveniently testing its continued ability to perform this shut-off function and is not adversely affected or disabled by repeated inversions, changes in altitude and changes in ambient pressure. The present invention fills the foregoing needs.

SUMMARY OF THE INVENTION

The present invention resides in a venting mechanism for discharging air from a fluid system. It includes a valve chamber at least partially filled with a liquid and a passage by which the gas to be vented is supplied to the chamber. An outlet valve prevents the escape of liquid from the chamber and an inlet valve can be included to prevent backflow of liquid from the chamber into the passage.

According to one aspect of the invention, the chamber is transparent, permitting observation of the venting gas passing therethrough and thereby providing verification that venting is taking place. According to another aspect of the invention, a piston is provided for reducing the effective volume of the chamber to determine whether the liquid can escape from the chamber.

The chamber may contain two check members each of which is at least partially spherical. One check member is buoyant and cooperates with an outlet seat to form the outlet valve while the other check member is non-buoyant and cooperates with an inlet seat to form the inlet valve. Preferably, the outlet valve continues to allow gas to escape from the chamber while it is closed to prevent the escape of liquid, thereby preventing the valve from becoming stuck in a closed position. The inlet valve seat can be part of the piston in an arrangement in which the passage extends through the piston.

The above-described venting mechanism may be advantageously employed in the hydraulic system of an aircraft and one aspect of the invention resides in a combination of such a venting mechanism with a degasser that separates air from the working fluid of such a system. In a preferred degasser, the working fluid is sprayed by a jet into a degassing chamber. A cycling valve at the bottom of the chamber opens and closes causing the chamber to fill and empty, with the gas being discharged as the chamber is filled with a vacuum in the chamber, necessary for degassing, being reformed as the chamber is emptied. The degasser may also include a valve arrangement that prevents working fluid from escaping from the system. The above-described venting mechanism is connected to the check valve to provide an emergency shut-off function in the event that a failure of the degasser permits liquid to enter the valve chamber.

These and other aspects and advantages of the invention will become apparent from the more detailed description below, taken in conjunction with the following drawings.

DESCRIPTION OF THE PREFERRED EMBODIMENT

To facilitate an understanding of the invention, the degasser 10 of the exemplary hydraulic system in which it is employed will be described first. This is the same degasser described in greater detail in the above-mentioned U.S. Pat. No. 3,969,092, that patent being incorporated by reference herein.

Figure 1:
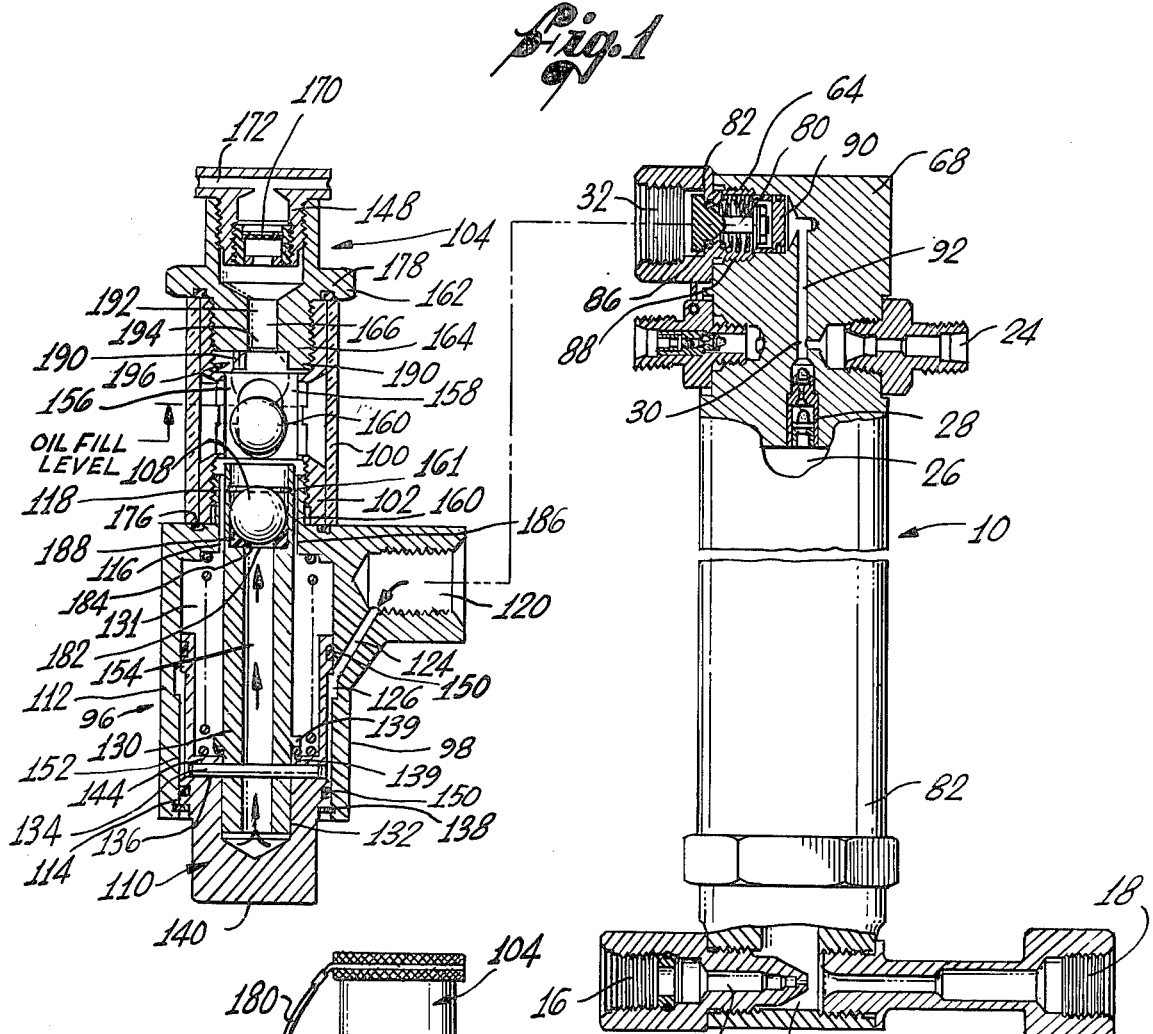
FIG. 1 is an elevational view of an apparatus, constructed in accordance with the present invention, for separating air from a hydraulic system, the apparatus including a degasser, partially broken away, and a venting mechanism, shown in crossection.
Figure 4:
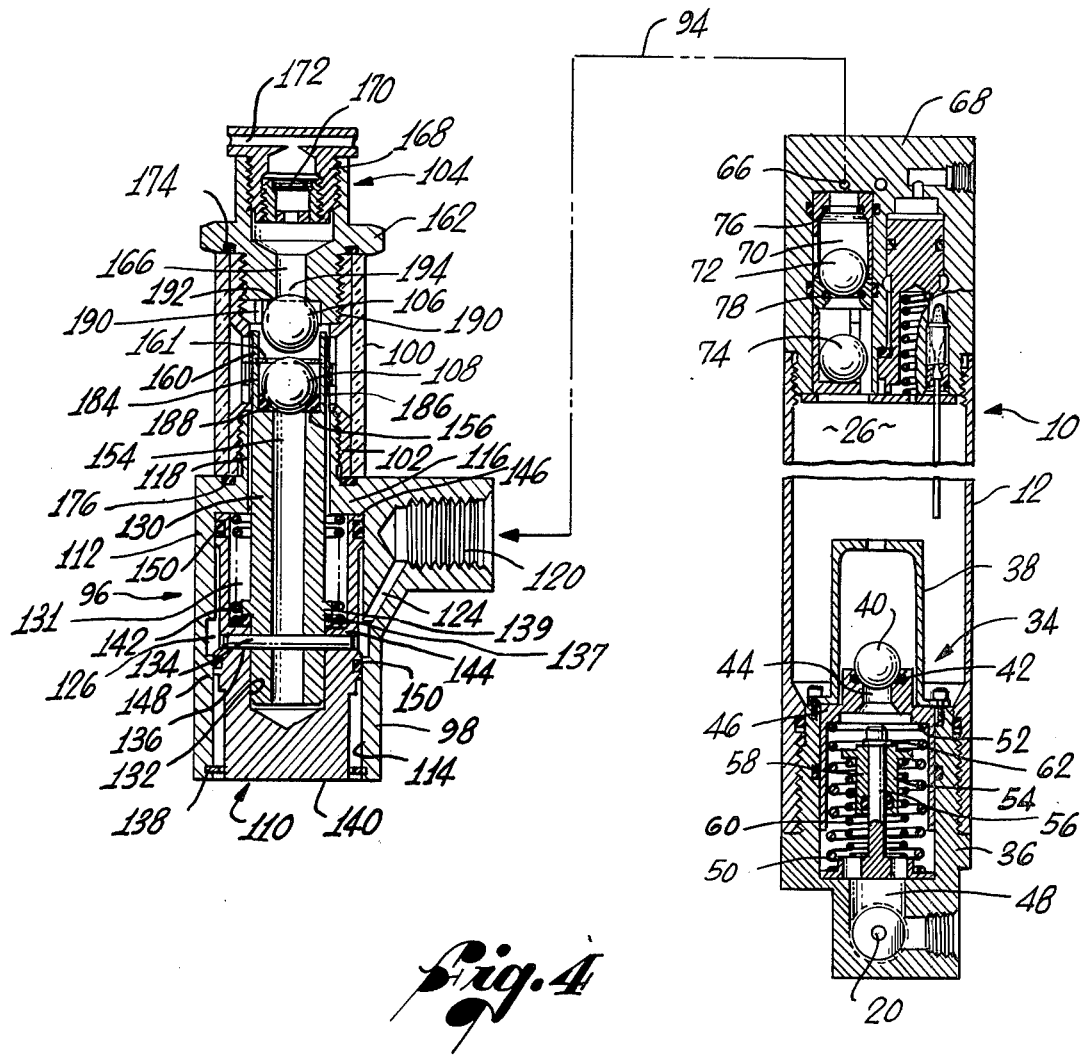
FIG. 4 is a cross-sectional view of the apparatus of FIG. 1, the degasser being partially broken away and the venting mechanism being shown with its piston in the actuated position.

The degasser 10, illustrated in FIGS. 1 and 4, includes a normally upright cylindrical body 12, the bottom section of which forms an aspirator assembly 14 (FIG. 1) including a pressure port 16 and a return port 18 on opposite sides thereof. Oil from the high pressure side of the system flows into the pressure port 16, through a conduit 20 of decreasing diameter, across a cavity 22 and out the return port 18 into the low pressure side of the system. Because of the high velocity oil flow through the cavity 22, a partial vacuum is formed in that portion of the aspirator 14.

A parasitic flow of a relatively small quantity of oil is supplied from the low pressure side of the system, downstream of the return port 18, through a degassing port 24 (FIG. 1), and into the top of the degasser 10. This oil is degassed as it moves downwardly through a chamber 26 and is drawn back into the system by the low pressure in the aspirator 14 at the bottom.

The flow rate of oil entering the degassing chamber 26 is controlled by a jet assembly 28 (FIG. 1) at the top of the chamber and connected to the degassing port 24 by a conduit 30. Oil sprayed by the jet assembly 28 moves to the bottom of the chamber 26 while separated air collects at the top when the chamber pressure is low. As the air pressure in the chamber 26 gradually rises, the air is expelled through an air discharge port 32 at the top.

The cyclical emptying and refilling of the degasser chamber 26 is controlled by a cycling valve 34 (FIG. 4) that includes a hollow, generally cylindrical housing 36 disposed in the lower end of the degasser body 12. An open cage 38 is mounted atop the housing 36 projecting upwardly into the chamber 26 and a buoyant ball 40 can move up and down within the cage. When the ball 40 is at the bottom of the cage 38, it rests on a seat 42 formed around a hole 44 at the top of a piston 46 slidably received within the housing 36. The housing 36 is closed at the bottom except for an opening 48 by which it communicates with the aspirator cavity 22. A compression spring 50 that engages the bottom of the housing 36 biases the piston 46 upwardly into contact with an annular flange 52 on the bottom of the cage 38.

The lower end of the hole 44 in the piston 46, opposite the ball seat 42, is closable by a relief valve 54 formed by a central post 56 integral with the bottom of the housing 36 and a sleeve 58 slidably fitted on the post. A second compression spring 60, concentrically disposed within the first spring 50, urges the sleeve 58 upwardly against a stop 62 at the top of the post 56.

Operation of the cycling valve 34 is as follows. During the degassing phase, the ball 40 is floated off its seat 42. Having moved upwardly to the full extent of its travel, the piston 46 is disengaged from the sleeve 58, leaving the cycling valve 34 open. Oil flows out from the bottom of the chamber 26 faster than it is sprayed in at the top and a vacuum is created at the top of the chamber as the oil level decreases. Once the oil level reaches the point at which the ball 40 closes the piston hole 44, however, the outward oil flow stops and the chamber 26 begins to refill while the ball 40 is held in place by the vacuum in the aspirator cavity 22.

The next phase is the venting phase in which the rising oil level in the chamber 26 compresses the separated air causing it to vent through the vent port 32. Eventually, the increasing pressure in the chamber 26 pushes the piston 46 down to engage the relief valve sleeve 58. Further, downward movement of the piston 46 then causes the end of the post 56 to unseat the ball 40, breaking the vacuum that held it in place and allowing the ball to float to the top of the cage 38 so that the valve opening is closed only by the sleeve 58. Finally the chamber pressure becomes high enough to push the sleeve 58 out of the piston hole 44, against the force of the second spring 60, and crack the relief valve 54 open. Oil then flows into the piston 46, reducing the pressure difference across it so that the first spring 50 can raise the piston to its original position, leaving the cycling valve 34 open fully for the next degassing phase.

Releasing the separated air from the degassing chamber 26 may be accomplished by any of a number of different means. In the presently preferred arrangement, a check valve 64 (FIG. 1) at the vent port 32 is designed to open when the air pressure in the degassing chamber 26 exceeds the ambient pressure by some small amount, such as 0.5 p.s.i. The check valve 64 is connected through a passage 66 in a discharge port housing 68 to a generally cylindrical ball chamber 70 that opens into the degassing chamber 26. Inside the ball chamber 70 is an arrangement of two balls 72 and 74, and two sealing rings 76 and 78. The upper sealing ring 76 serves as a seat for the upper ball 72 and seals the passage 66. The lower sealing ring 78 is located between the balls 72 and 74 and serves as a seat for either, but not both balls. An air pressure slightly above that on the outside of the check valve 64 will lift the upper ball 72 from the lower sealing ring 78 and allow air to pass through to the check valve 64, but a rising oil level will force at least one of the balls 72, 74 upwardly against a corresponding one of the sealing rings 76, 78, and prevent significant amounts of oil from escaping. Upon reapplication of vacuum, the upper ball 72 will drive the lower ball 74 off the lower sealing ring 78, sealing the degassing chamber 66, as shown in FIG. 4.

The check valve 64 includes a valve stem 80, a valve seal 82, a valve seat 84, and a spring 86 (FIG. 1). Also included is another spring 88 and a valve override piston 90, which together act to hold the valve closed and prevent leakage if pressure is ever reduced unacceptibly at the degassing port 24. A passage 92 communicates pressure from the degassing port 24 to the override piston 90 and compresses the second spring 88 to allow the check valve 64 to operate normally.

Air separated by the degasser 10 is supplied from the vent port 32, by a line 94, to an exemplary venting mechanism 96 constructed according to the present invention and illustrated in FIGS. 1-4. An important function of this mechanism 96 is to vent the separated air to the atmosphere while protecting the hydraulic system from any possible loss of oil in the event of a failure of the degasser 10 that might otherwise permit such loss. Another important function of the venting mechanism 96 is to provide a readily observable indication that the degasser 10 is working properly and that separated air is being vented.

In general, the venting mechanism 96 includes a base 98, a valve chamber 100 mounted on the base, a ball retainer 102 disposed within the chamber, a vent port assembly 104 mounted atop the chamber, check balls 106 and 108 movable within the retainer, and a piston assembly 110 slidable within the base and capable of projecting into the chamber.

The base 98 is generally cylindrical, except for a rectangular, box-like top section 112, being mounted in the aircraft in such a manner that its longitudinal axis is vertical, as is a cylindrical bore 114 that extends completely therethrough. At the top of the bore 114, the base 98 carries a radially inwardly projecting shoulder 116 so that the diameter of the bore is reduced within this shoulder. Surrounding the end of the bore 114 and projecting upwardly from the top section 112 is an externally threaded cylindrical mounting 118.

Figure 2:
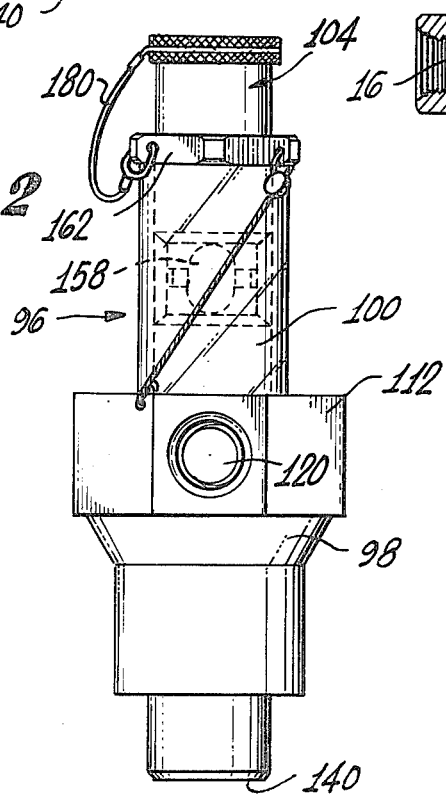
FIG. 2 is an elevational side view of a venting mechanism included in the apparatus of FIG. 1.
Figure 3:
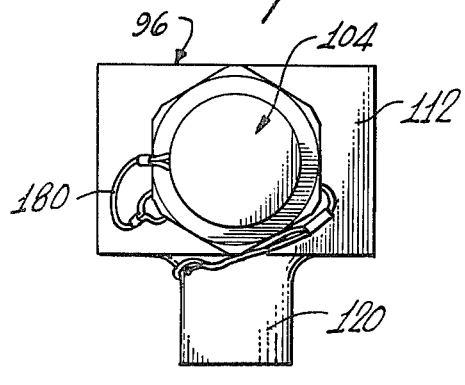
FIG. 3 is an elevational top view of the venting mechanism.

Flush with the top of the base 98 is an inlet port 120 that projects from the top section 112 in a normally horizontal position for connection by the air line 94 to the discharge port 32 of the degasser 10. Air that enters the inlet port 20 is supplied, by a downwardly inclined internal conduit 124 of lesser diameter, to an inwardly opening annular recess 126 formed circumferentially about half way up the side of the bore 114 (FIGS. 1 and 2).

Disposed within the bore 114 is the piston assembly 110, consisting principally of a cup-shaped outer piston 128 axially slidably beneath the shoulder 116, and a considerably longer hollow tubular inner piston 130 which is of a smaller diameter so that it is slidably received by the shoulder, leaving an enclosed annular cavity 131 between the inner piston and the sides of the bore. The lower end of the inner piston 130 is inserted in a radially centered pocket 132 in the bottom of the outer piston 128 where it is locked in place by a horizontal connection pin 134 loosely received by a cross-bore 136 that extends radially through the inner and outer pistons. A sealing ring 137 is compressed between the top of the inner piston 128 and a flange 139 on the inner piston 130 to prevent leakage from the cavity 131 into the pocket 132.

While the outer piston 128 is capable of vertical reciprocation within the base 98, its travel is limited at its upper end by the shoulder 116 and at its lower end by a snap ring 138 positioned in a circumferential groove in the base near the bottom of the bore 114. A lower portion of the outer piston 128, which is of reduced diameter, extends through the snap ring 138. The bottom of the outer piston 128 forms an exposed bottom surface 140 by which the piston assembly 110 can be manually actuated, i.e., pushed upwardly into the bore 114. A compression spring 142, that encircles the inner piston 130 and bears against the underside of the shoulder 116 at the top and against an upwardly facing shoulder 144 surrounding the pocket 132 in the bottom of the outer piston 128, biases the piston assembly 110 downwardly.

The outer piston 128 carries two vertically spaced integrally formed collars 146 and 148 on its outer cylindrical surface, each of which is grooved circumferentially to retain a piston ring 150, creating a liquid-tight seal between the outer piston and the inner surface of the bore 114. Between the collars 146 and 148, the outer piston 128 is of a slightly lesser diameter than the bore 114 to leave a thin annular space 152 in communication with the annular recess 126. Air that is supplied to the inlet port 120 flows down the conduit 124, into the annular recess 126, along the sides of the outer piston 128 to the connecting pin 134, and through the cross-bore 136 into a vertical passage 154 within the hollow inner piston 130.

Mounted atop the base 98 is the cylindrical, transparent, glass, valve chamber 100, the longitudinal axis of which is aligned with that of the bore 114. It is positioned by the ball retainer 102 which it snugly receives, the retainer being internally threaded for securement to the mounting 118 atop the base 98.

The ball retainer 102 has a normally vertical bore 156 large enough to receive the protruding top end of the inner piston 130 as the piston assembly 110 reciprocates. The two check balls 106 and 108, which are of equal diameter, are stacked one above the other within the retainer bore 156, where their movement can be observed through vertically elongated windows or slots 158 in the central portion of the retainer 102. This retainer configuration minimizes drag on the balls 106 and 108 as they move within the bore 156. The lower of the two balls 108 is receivable in an upper portion 160 of the inner piston 130 which is of increased inner diameter and which projects into the chamber 100, even when the piston assembly 110 has moved to the lower limits of its travel. Upward movement of the lower ball 108 is limited by a snap ring 161 on the inner surface of the upper portion 160.

At the top of the valve chamber 100 is the vent port assembly 104, including a main body 162 that carries a downwardly projecting externally threaded mounting 164 engaged by internal threads at the top end of the ball retainer 102. A central vertical bore 166 in the body 162, aligned with the retainer bore 156, extends upwardly to a threadedly received filter holder 168 by which a filter element 170 is positioned across the bore 166 to prevent contaminants from entering the system. From the outside of the filter 170, the bore 166 continues upwardly through the filter holder 168 to a horizontal vent conduit 172 through which air can be freely discharged into the atmosphere.

The valve chamber 100 is partially filled and the entire cavity 131 is filled with a liquid, preferably the oil used as the working fluid of the hydraulic system. Sealing rings 174 and 176 at the top and bottom of the valve chamber 100, recessed in the vent port assembly both 162 and the base 98, respectively, prevent leakage of liquid from the chamber. To add liquid, the filter holder 168 can be unscrewed from the body 162 and the liquid poured through the vent port bore 166. So that components of the mechanism 96 can not be lost while the liquid is being added, or removed, the filter holder 168 is tied to the body 162 by a flexible cable 180 (FIG. 2).

Although the check balls 106 and 108 are of the same size, their densities are different. The upper ball 106 is hollow, having a slightly lower density than the liquid, and is buoyant. The lower ball 108 is more dense, being solid, and is non-buoyant in the liquid.

When the venting mechanism 96 is in its normal vertical position and the degasser 10 is working properly, the lower ball 108 settles into the enlarged portion 160 at the top of the inner piston 130 where it is received in blocking relation by an appropriately shaped inlet seat 182 which defines an inlet opening 184 through which the passage 154 within the inner piston 130 communicates with the interior of the chamber 100. The lower ball 108 and the inlet seat 182 form an inlet valve 186 which allows air from the degasser 10 to flow up through the passage 154 and lift the lower ball 108, thus entering the valve chamber 100. The air then bubbles up through the liquid in the chamber 100, providing a visual indication that venting is taking place, and flows unrestricted through the vent port assembly 104 into the atmosphere. The inlet valve 186 does not allow the liquid in the chamber 100 to backflow into the passage 154 and the inlet seat 182 includes an O-ring 188 to insure against leakage. If a good seal were not provided, leakage would occur when a decrease in altitude caused the ambient air pressure to exceed the pressure in the air line 94.

If the degasser 10 were to fail, permitting oil to pass through the air discharge port 32, only a small amount of oil could enter the valve chamber 100, before the flow would be stopped. The buoyant upper check ball 106 would rise with the liquid level in the chamber 100 until positioned by three equally spaced guides 190 projecting from the bottom of the vent port body 162. It would thus be received in blocking relation by an outlet seat 192 that defines an outlet opening 194 at the bottom of the vent port bore 166 (the upper ball being shown in this raised position in phantom lines in FIG. 1). The outlet seat 192 and upper ball 108 thus forming an outlet valve 196 that acts as an emergency shut-off to prevent loss of liquid from the system through the degasser 10. It also prevents loss of the liquid normally present in the valve chamber 100 when the aircraft is inverted. When the venting mechanism 96 is inverted, the buoyant upper ball 106 (now on the bottom) does not float off the outlet seat 192 because a portion of the ball within the seat is not contacted by the oil, this portion being large enough to prevent floatation.

It should be noted that the outlet seat 192 is a "hard seat" and does not include an O-ring, as in the case of the inlet seal 182. Moreover, the outlet seat 192 has a slight intentional ovality, although it is, in general, shaped and dimensioned to receive the spherical surface of the ball 106.

While the outlet valve 196 thus constructed will not leak fluid, it will leak air, which is advantageous. The air leakage capability allows air to escape from the venting mechanism 96 in the event that the degasser 10 should discharge air while the aircraft is inverted. If the outlet valve were air tight, the above-atmospheric pressure created by inverted venting might hold the upper ball 106 against the outlet seat 192, thus disabling the degasser 10. It is preferable that the outlet valve 196 be capable of leaking air at the highest rate at which air is discharged from the degasser 10 to insure that the ball 106 can not become stuck.

It will be appreciated from the foregoing that the venting mechanism 96 of the invention provides a convenient visible indication that the degasser 10 is functioning. In addition, it provides an emergency shut-off function. In connection with this last function in particular, it is important that maintenance personel be able to verify at will that the vent mechanism 96 remains operational. To obtain such verification one simply presses the exposed lower button surface 140 of the outer piston 128, thereby lifting the fluid column and closing the outlet valve 196. It can then be observed that fluid does not escape through the valve 196 or otherwise leak from the chamber 100. Manual actuation of the piston assembly 110 also verifies that the mechanism 96 is venting properly since the piston assembly 110 could not move to the end of its normal travel nor could the fluid column rise to the top of the chamber 100 unless air was expelled.

While a particular embodiment of the invention has been illustrated and described in detail, it will be appreciated that various modifications can be made without departing from the spirit and scope of the invention. Accordingly, the invention is not to be limited, except as by the appended claims.

We claim:

1. A venting mechanism for discharging a gas from a fluid system comprising:
   a valve chamber at least partially filled with a liquid;
   a passage by which gas to be vented is supplied to said valve chamber below the level of said liquid; and
   outlet valve means at the top of said chamber for automatically permitting the escape of said gas from said chamber and for preventing the escape of said liquid from said valve chamber;
   at least a portion of said valve chamber being transparent to permit observation of said liquid as vented gas passes therethrough, thereby providing visual verification that said gas is being vented.

2. The venting mechanism of claim 1 further comprising piston means for reducing the effective volume of said valve chamber to determine whether said liquid can escape from said valve chamber.

3. The venting mechanism of claim 1 wherein said outlet valve means comprises an outlet seat and a check member engageable with said seat, said check member being buoyant in said liquid.

4. In a hydraulic system having a degasser for removing air that is entrained or dissolved in a hydraulic fluid, a venting mechanism for discharging said removed air comprising:
   a valve chamber partially filled with a liquid;
   a passage leading from said degasser to said valve chamber and entering said valve chamber below the level of said liquid; and
   outlet valve means for automatically permitting the escape of air from said valve chamber and for automatically preventing the escape of said liquid from said valve chamber, said outlet valve means including a check member within said chamber that is buoyant in said fluid;
   at least a portion of said valve chamber being transparent to permit observation of said liquid as vented gas passes therethrough, thereby providing visual verification that said gas is being vented.

5. The apparatus of claim 4 wherein said degasser includes means for preventing the flow of liquid to said passage.

6. The venting mechanism of claim 4 further comprising inlet valve means for permitting said gas to flow from said passage into said valve chamber and for preventing the backflow of said liquid into said passage.

7. The venting mechanism of claim 6 further comprising piston means for reducing the effective volume of said valve chamber to determine whether said liquid can escape from said valve chamber.

8. A venting mechanism for discharging a gas from a fluid system comprising:
   a valve chamber at least partially filled with a liquid;
   a passage by which gas to be vented is supplied to said valve chamber;
   inlet valve means for permitting gas to flow into said valve chamber below the level of said liquid and for preventing the backflow of said liquid into said passage;
   a check member movably disposed within said valve chamber, said check member being buoyant in said liquid; and
   outlet seat means above the level of said liquid for defining an outlet opening through which said gas can escape automatically from said valve chamber after passing through said liquid and for receiving said check member to block said outlet opening, to automatically prevent the escape of said liquid through said outlet opening, said outlet seat means being disposed on the opposite side of said check member from said inlet valve means;
   at least a portion of said valve chamber being transparent to permit observation of said liquid as vented gas passes therethrough, thereby providing verification that said gas is being vented.

9. The mechanism of claim 8 wherein said inlet valve means comprises:
- a second check member movably disposed within said valve chamber beneath said first check member, said second check member being non-buoyant in said liquid and being disposed between first-mentioned check member and said passage; and
- inlet seat means located beneath said second check member for receiving said second check member in sealing relationship thereto.

10. The mechanism of claim 8 wherein said check member is at least partially spherical and said outlet seat means defines a surface having a slight ovality such that said liquid cannot pass through said outlet opening but said gas can pass through said outlet opening when said check member is received by said outlet seat means.

11. The mechanism of claim 10 wherein said intake valve means comprises:
- a second check member movably disposed within said valve chamber, said second check member being non-buoyant in said liquid and being disposed between first-mentioned check member and said passage; and
- inlet seat means for receiving said second check member.

12. The mechanism of claim 8 wherein said outlet seat means is configured such that said gas but not said liquid can pass between said outlet seat means and said check member when said check member is received by said outlet seat means.

13. An air-venting mechanism for discharging gas from a fluid system comprising:
- a valve chamber at least partially filed with a liquid;
- a passage by which gas to be vented can be introduced into said valve chamber below the level of said liquid;
- a check member movably disposed within said valve chamber, said check member being buoyant in said liquid;
- an outlet seat disposed on the opposite side of said check member from said passage and defining an outlet opening by which gas can escape from said valve chamber after passing through said liquid, said outlet seat being shaped and dimensioned to receive said check member in blocking relation to said outlet opening thereby preventing the escape of liquid through said outlet opening; and
- piston means for reducing the effective volume of said valve chamber and thereby urging said check member against said outlet seat to determine whether said liquid can escape from said valve chamber.

14. The mechanism of claim 13 wherein said valve chamber is at least partially transparent to permit observation of said liquid as vented gas passes therethrough, thereby providing verification that said gas is venting.

15. The mechanism of claim 13 wherein said check member is at least partially spherical and said outlet seat defines a surface having a slight ovality such that said liquid cannot pass through said outlet opening but said gas can pass through said outlet opening when said check member is received by said outlet opening.

16. The mechanism of claim 13 further comprising:
- a second check member movably disposed within said valve chamber, said second check member being non-buoyant in said liquid and being disposed between said first-mentioned check member and said passage; and
- an inlet seat defining an inlet opening by which said passage is connected to said valve chamber, said inlet seat being shaped and dimensioned to receive said second check member in blocking relation to said inlet opening, thereby preventing backflow of said liquid from said valve chamber into said passage.

17. The mechanism of claim 16 wherein said passage extends through said piston means.

18. An air-venting mechanism for connection to a hydraulic system degasser comprising:
- a base;
- a piston slidably disposed within said base for reciprocation therein;
- an inlet port formed in said base for supplying air to be vented;
- a passage extending through said piston in communication with said inlet port to receive said air;
- a valve chamber partially filled with a liquid mounted on said base and arranged to receive at one end thereof a portion of said piston which projects therein as said piston reciprocates within said base;
- an outlet seat disposed at the end of said valve chamber opposite said piston and defining an outlet opening;
- a vent port connected to said valve chamber by said outlet opening;
- a first check member movably disposed within said valve chamber and shaped and dimensioned to be received by said outlet opening to prevent said liquid from escaping from said valve chamber, said first check member being buoyant in said liquid;
- an inlet seat formed on said piston and defining an inlet opening by which said passage is connected to said valve chamber; and
- a second check member movably disposed within said valve chamber between said first check member and said inlet seat, said second check member being shaped and dimensioned to be received by said inlet seat to prevent backflow of said liquid from said valve chamber into said passage.

19. The mechanism of claim 18 wherein said valve chamber is at least partially transparent to permit observation of said liquid as vented air passes therethrough.

20. The mechanism of claim 18 wherein said valve chamber includes a cylindrical bore and said first and second check members are at least partially spherical.

21. The mechanism of claim 20 wherein said outlet seat has a slight ovality such that said liquid cannot pass through said outlet opening but said air can pass through said outlet opening when said first check member is received by said outlet seat.

22. The mechanism of claim 18 further comprising spring means for biasing said piston away from said valve chamber.

23. The mechanism of claim 22 further comprising an exposed button surface carried by said piston for manual actuation thereof.

24. An air-venting mechanism for use with a hydraulic system degasser comprising:
- a base having a cylindrical bore therein;
- a piston slidably disposed within said bore for reciprocation therein;
- an inlet port for supplying to said base air to be vented;
- a conduit within said base connecting said inlet port to said bore;

a passage extending through said piston and in communication with said conduit to receive said air therefrom;

a transparent, cylindrical, glass, valve chamber partially filled with liquid, mounted on said base and arranged to receive at one end thereof a portion of said piston which projects therein as said piston reciprocates within said bore;

a compression spring disposed within said bore and encircling said piston, urging said piston away from said valve chamber;

an exposed button surface on said piston for manual actuation thereof;

an outlet seat at the end of said valve chamber opposite said piston defining an outlet opening at the center thereof, said outlet seat having a slight ovality;

a vent port connected to said valve chamber by said outlet opening;

a filter disposed across said vent port;

a first spherical check member movably disposed within said valve chamber and shaped and dimensioned to be received by said outlet seat to prevent said liquid from escaping from said valve chamber while permitting air to escape from said valve chamber, said first check member being buoyant in said liquid;

an inlet seat formed on said piston and defining an inlet opening by which said passage is connected to said valve chamber; and a second spherical check member movably disposed within said valve chamber between said first check member and said inlet seat, said second check member being shaped and dimensioned to be received by said second seat to prevent backflow of said liquid from said valve chamber into said passage.

25. A degassing apparatus for separating air from the working fluid of an aircraft hydraulic system and venting said separated air into the atmosphere comprising:

aspirator means for creating a low pressure region between the high and low pressure sides of said hydraulic system;

a degassing chamber;

jet means for spraying said working fluid into said degassing chamber;

cyclic valve means for connecting said chamber to said low pressure region and for periodically closing and opening to cause filling and emptying of said degassing chamber;

check valve means for releasing air from said degassing chamber;

a valve chamber at least partially filled with a liquid;

a passage by which air is supplied from said release valve to said valve chamber;

a check member movably disposed within said valve chamber, said check member being buoyant in said liquid; and outlet seat means for defining an outlet opening through which said air can escape from said valve chamber and for receiving said check member to block said outlet opening, thereby preventing the escape of liquid through said outlet opening, said seat means being disposed on the opposite side of said check member from said passage;

at least a portion of said valve chamber being transparent to permit observation of said liquid as vented air passes therethrough, thereby providing verification that said air is being vented.

26. The apparatus of claim 25 further comprising:

a second check member movably disposed within said chamber, said second check member being non-buoyant in said liquid and being disposed between first-mentioned check member and said passage; and inlet seat means for receiving said second check member and preventing said liquid from entering said passage.

27. The apparatus of claim 25 further comprising piston means for reducing the effective volume of said valve chamber and thereby urging said check member against said outlet seat means to determine whether said liquid can escape from said valve chamber.

28. A degassing apparatus for separating air from the working fluid of an aircraft hydraulic system and venting said separated air into the atmosphere comprising:

aspirator means for creating a low pressure region between the high and low pressure sides of said hydraulic system;

a degassing chamber;

jet means for spraying said working fluid into said degassing chamber;

cyclic valve means for connecting said chamber to said low pressure region and for periodically closing and opening to cause filling and emptying of said degassing chamber;

check valve means for releasing air from said degassing chamber;

a valve base having a cylindrical bore therein;

a piston slidably disposed within said bore for reciprocation therein;

an inlet port connecting said air release valve means to said base;

a conduit within said base connecting said inlet port to said bore;

a passage extending through said piston and in communication with said conduit to receive said air therefrom;

a transparent, cylindrical, glass, valve chamber partially filled with liquid, mounted on said base and arranged to receive at one end thereof a portion of said piston which projects therein as said piston reciprocates within said bore;

a compression spring disposed within said bore and encircling said piston, urging said piston away from said valve chamber;

an exposed button surface on said piston for manual actuation thereof;

an outlet seat at the end of said valve chamber opposite said piston defining an outlet opening at the center thereof, said outlet seat having a slight ovality;

a vent port connected to said valve chamber by said outlet opening;

a filter disposed across said vent port;

a first spherical check member movably disposed within said valve chamber and shaped and dimensioned to be received by said outlet seat to prevent said liquid from escaping from said valve chamber while permitting air to escape from said valve chamber, said first check member being buoyant in said liquid;

an inlet seat formed in said piston and defining an inlet opening by which said passage is connected to said valve chamber; and a second spherical check member movably disposed within said valve chamber between said first check member and said inlet seat, said second check member being shaped and dimensioned to be received by said inlet seat to prevent backflow of said liquid from said valve chamber into said passage.

29. In a hydraulic system having a degasser for removing air that is entrained or dissolved in a hydraulic fluid, a venting mechanism for discharging said removed air comprising:

a valve chamber partially filled with a liquid;

a passage leading from said degasser to said valve chamber and entering said valve chamber below the level of said liquid, and outlet valve means for automatically opening to permit the escape of air from said valve chamber and for automatically closing to retain said liquid in said chamber when said chamber is inverted;

at least a portion of said valve chamber being transparent to permit observation of said liquid as vented gas passes therethrough, thereby providing visual verification that said gas is being vented.

30. A venting mechanism for discharging gas from a fluid system comprising:

a valve chamber at least partially filled with a liquid, at least a portion of said chamber being transparent to permit observation of said liquid as vented gas passes therethrough, thereby providing verification that said gas is being vented;

a passage by which gas to be vented is supplied to said valve chamber below the level of said liquid; and inlet valve means for automatically permitting said gas to flow into said chamber while preventing the backflow of said liquid into said passage.

* * * * *